UNITED STATES PATENT OFFICE.

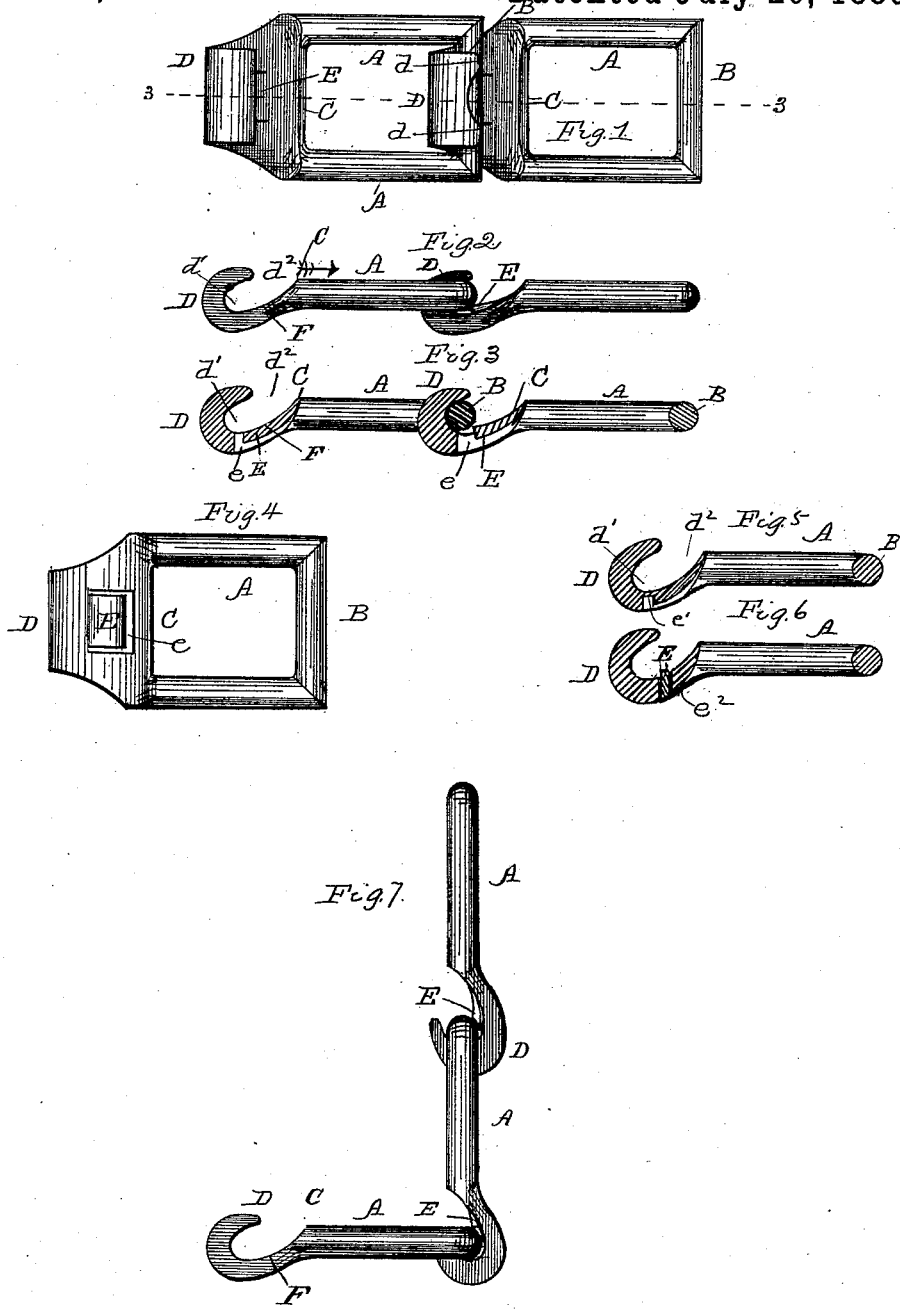

NELLY P. LEVALLEY, OF MILWAUKEE, WISCONSIN.

DRIVE-CHAIN.

SPECIFICATION forming part of Letters Patent No. 345,707, dated July 20, 1886.

Application filed October 14, 1885. Serial No. 179,899. (Model.)

*To all whom it may concern:*

Be it known that I, NELLY P. LEVALLEY, a citizen of the United States, residing at Milwaukee, in the county of Milwaukee and State of Wisconsin, have invented certain new and useful Improvements in Drive-Chains, of which the following is a specification, reference being had therein to the accompanying drawings.

Figure 1 is a top plan view of two links containing my invention, they being coupled together. Fig. 2 is an edge view of the same. Fig. 3 is a longitudinal section on the line 3 3, Fig. 1. Figs. 4, 5, and 6 are views of links illustrating modifications. Fig. 7 is an edge view of three links shown in the position occupied when they are to be uncoupled.

In the drawings, A A represent the side bars, B one end bar, and C the opposite end bar of a centrally-open rectangular drive-chain link. The side bars, A A, and end bar B may be of any desired relative size and of any shape in cross-section, although I prefer to make these three parts circular in cross-section and of substantially the same diameter. The end bar C carries a coupling-hook, D, adapted to receive the opposite end bar B of an adjacent link. This hook is somewhat elongated, the width of the throat $d^2$, together with the depth of the chamber $d'$ in the hook, being about equal to twice the diameter of end bar B, so that when the end bar is in place in said hook there is ample room between it (the end bar) and the throat through which it enters and passes out of the hook for the interposition of a keeper adapted to retain the end bar in place. The rear bottom wall of the hook, from the line F immediately in rear of the seat $d'$ to the end bar C, is substantially straight and slopes upward and backward, thus serving to guide and direct the end bar from its seat in the hook.

E is a small lip or tongue of metal, situated in the bottom of hook D between the seat portion $d'$ thereof and the throat $d^2$, and adapted to be forced upward into the path of the end bar by which it enters or passes from said hook, and thus so contract the throat of the hook that it will be impossible for the end bar to escape from the hook except when intentionally forced out.

In Figs. 1, 2, and 3 I have shown this keeper as consisting of a tongue of metal formed integrally with the hook to which it is united by one edge, and situated in an aperture, $e$. After the end bar has passed into the hook, this lip E is struck from below, or otherwise forced upward slightly into the path of the end bar, thus effectually securing it in its seat. It will be understood that this keeper may be modified in many ways—as, for instance, it may be attached to the hook by any one of its four edges; or it might be united all round by a film of metal, $e'$, which, however, must be sufficiently thin to allow the part E to be forced into the path of the end bar; or the part E might be made separate and apart from the link and attached thereto by a spring, $e^2$, adapted to force it through aperture $e$ into the path of the end bar, or by any other device which would permit the keeper to be forced through said aperture after the end bar has entered the hook.

To further insure locking the end bar within the hook, the points of the hook may be somewhat extended, as at $d\,d$, and forced down over the end bar.

When it is desired to uncouple the links, they may be turned into the positions shown in Fig. 7, when by striking the upper link a blow with a hammer it will be uncoupled from the link next below, the end bar forcing the keeper E and the down-bent portions $d$ of the hook sufficiently out of its path to allow it to pass out.

From an examination of the drawings it will be seen that the end bars and side bars and hook are not provided with projections or depressions, as have heretofore been necessary in drive-chains of this character in order to retain the end bar within the hook. This allows the links to be easily coupled without turning them in to what is known in the art as an "unusual" position, and uncoupled when there is but little slack to the chain, and also leaves the articulations perfectly free for the escape of dirt and grit, which have heretofore often been retained by reason of such projections or depressions, and which have resulted in rapidly cutting out the articulating portions of the links.

From an examination of the drawings it will be seen that by reason of the throat $d^2$—that is to say, the throat through which the end bar may be caused to escape after all the parts are in position of attachment—being in rear of seat $b'$ for the end bar, and because of there being no permanently-arranged projections either upon the end bars, C or B, or upon the hook D to positively obstruct the passage of the end bar into or out of the hook, the links may be uncoupled when they are in line with each other, because if one link be forced against the other in the direction of the arrow, Fig. 2, as by the blow of a hammer, the end bar of the link will force its way through the throat of the hook, bending in its passage the tongue E and the lips $d$ the necessary extent to let it pass out, the elongated form of the hook and its sloping bottom wall serving to guide the end bar backward and upward through the throat, there being no positive unyielding abutment to prevent the links being intentionally forced apart when in line. This is a very desirable capability, as it is often necessary to uncouple two links when the chain is somewhat under tension, and when it is practically impossible to secure sufficient slack to allow the links to be turned to a right or acute angle relatively to each other, in order to allow uncoupling. So far as this capability of uncoupling the links when in line with each other is concerned, it is immaterial whether the tongue E alone is employed to retain the end bar, or whether it is supplemented by bending over the lip of the hook, or even whether the hook only is depended upon for confining the end bar, so long as there remains a permanently-open space or throat in rear of the end bar, through which it may back or be forced out. It will be seen that the tongues or projections E, which are forced into the path of the end bars to retain them in their seats, lie below the central longitudinal planes of the end bars when in the position shown in Figs. 2 and 3, and hence require to be moved but a very short distance in order to so intersect the path traversed by the end bars as they enter the hooks, as to retain them in their seats.

In the construction which I have shown the end bar B serves as a stop to limit the extent to which the keeper E may be moved, and insures there being a permanently-open space left between the keeper and the lip of the hook, through which space or throat the end bar may pass, as the keeper is stopped before passing the central longitudinal line of the end bar, and so will be forced back into substantially the position from which it was moved, rather than be broken off.

I am aware that the hooks of drive-chain links have been bent down to insure the coupling together of links, and that for the same purpose lips or projections of various sorts have been bent to close the throats leading into the hooks of such links, and hence I do not claim, broadly, such means for coupling together drive-chains; but I believe that I am the first to have so arranged the coupling devices that the links may be intentionally uncoupled by forcing one link against that next in the rear thereof.

I am also aware of Patent No. 30,797 granted to J. Blocher December 4, 1860, wherein is shown a chain made up of S-shaped metal plates having their ends bent in opposite directions, and being united by hooking the ends into each other, their escape being prevented by means of L-shaped plates riveted to one end of each of the links, and hence I do not claim anything shown in said patent; but a chain of this character necessitates that the links shall be arranged in a zigzag line and not in a common plane, as in my case. It further differs in having every plate of which the chain is made up provided at each end with a hook, the two hooks being bent oppositely, whereas I use but a single hook to each link, all the hooks being bent in the same direction. In my case the coupling-hook of one link passes through the link to which it is coupled and engages with a portion thereof, thus allowing the links to be arranged in one and the same plane.

What I claim is—

1. A drive-chain consisting of rectangular links having end bars and coupling-hooks elongated in the direction of the length of the links, each hook having a seat for the end bar of an adjoining link, and a throat through which the end bar passes to said seat, situated in rear of the seat, and being free from permanently-arranged projections, which would prevent the entrance of the end bar without turning its link into an unusual position, the bottom wall of the hook, from the line F immediately in rear of the seat to the end bar C, being substantially straight and sloping upward and backward, and the lip of the hook extending over the end bar and arranged to be bent down to confine the end bar in its seat, whereby the links are adapted to be uncoupled when in line with each other, substantially in the manner described.

2. A drive-chain consisting of rectangular links having end bars and coupling-hooks, each hook having a keeper situated below the central longitudinal line of the end bar which it retains, and adapted to be forced upward into the path traversed by the end bar as it passes from the hook, whereby the links may be uncoupled when in line with each other by forcing one link backward against the next, substantially as set forth.

3. A drive-chain consisting of rectangular links having end bars, and coupling-hooks in which the end bars lie, each hook being provided with a keeper situated below the central longitudinal plane of the end bar which it confines, and being adapted to be forced upward into the path of the end bar, the end bar operating to stop the movement of the keeper and prevent its being forced past the central line thereof, substantially as set forth.

4. A rectangular drive-chain link provided at one end with a coupling-hook, and having a keeper situated below the throat, through which the end bar enters the hook, and adapted to be forced upward to intersect the path of the end bar between the throat $d^2$ of the hook and the seat $d'$ therein, substantially as set forth.

5. A rectangular drive-chain link provided at one end with an end bar and at the opposite end with a coupling-hook, in which is formed an aperture, and a keeper projecting through said aperture from the under side, and adapted to be forced upward to intersect the path of the end bar between the throat $d^2$ of the hook and the seat $d'$ therein, substantially as set forth.

6. A rectangular drive-chain link provided at one end with a coupling-hook adapted to receive the end bar of an adjoining link, said hook being provided with a vertical aperture, $e$, and with a tongue or lip, E, formed integrally with the hook, and lying in said aperture, it being adapted to be forced into the path by which the end bar enters the hook, substantially as set forth.

In testimony whereof I affix my signature in presence of two witnesses.

NELLY P. LEVALLEY.

Witnesses:
C. W. LEVALLEY,
J. B. STEMPER.